(12) United States Patent
Monbetsu et al.

(10) Patent No.: US 12,567,098 B2
(45) Date of Patent: Mar. 3, 2026

(54) RECOMMENDATION SYSTEM, SERVER PROGRAM, AND CLIENT PROGRAM

(71) Applicants: INCREDIBLE LLC., Tokyo (JP); MAHORO COMPANY, INC., Tokyo (JP)

(72) Inventors: Satoru Monbetsu, Tokyo (JP); Satoshi Kosugi, Tokyo (JP)

(73) Assignees: INCREDIBLE LLC., Tokyo (JP); MAHORO COMPANY, INC., Tokyo (JP)

( * ) Notice: Subject to any disclaimer, the term of this patent is extended or adjusted under 35 U.S.C. 154(b) by 276 days.

(21) Appl. No.: 18/261,413

(22) PCT Filed: Dec. 6, 2021

(86) PCT No.: PCT/JP2021/044700
§ 371 (c)(1),
(2) Date: Jul. 13, 2023

(87) PCT Pub. No.: WO2022/153715
PCT Pub. Date: Jul. 21, 2022

(65) Prior Publication Data
US 2024/0062269 A1 Feb. 22, 2024

(30) Foreign Application Priority Data
Jan. 13, 2021 (JP) ................................. 2021-003755

(51) Int. Cl.
*G06Q 30/00* (2023.01)
*G06Q 20/32* (2012.01)
(Continued)

(52) U.S. Cl.
CPC ....... *G06Q 30/0631* (2013.01); *G06Q 20/322* (2013.01); *G06Q 30/0206* (2013.01)

(58) Field of Classification Search
CPC .................................................. G06Q 30/0631
See application file for complete search history.

(56) References Cited

U.S. PATENT DOCUMENTS

| 12,333,594 | B1 * | 6/2025 | Mani ................... | G06F 3/04815 |
| 2015/0363407 | A1 * | 12/2015 | Huynh ................... | G06F 16/35 |
| | | | | 707/738 |
| 2024/0394676 | A1 * | 11/2024 | Siddique ............... | G06Q 30/02 |

FOREIGN PATENT DOCUMENTS

| JP | 2010262383 A | 11/2010 |
| JP | 2013161116 A | 8/2013 |

(Continued)

OTHER PUBLICATIONS

Mukhopadhyay, Debajyoti, et al. "A product recommendation system using vector space model and association rule." 2008 International Conference on Information Technology. IEEE, 2008.*

(Continued)

*Primary Examiner* — Kathleen Palavecino
(74) *Attorney, Agent, or Firm* — NIXON & VANDERHYE

(57) ABSTRACT

A server device includes: an interest information formation unit for forming interest information which is a vector obtained by digitizing a plurality of adjectives expressing a user, item information, and shop information; a distance calculator for calculating a first distance between the interest information for the user and the interest information on the item information, and a second distance between the interest information for the user and the interest information on the shop information; a recommendation information determination unit for determining that if the first distance and the second distance meet prescribed conditions, the item information corresponding to the first distance and the shop information corresponding to the second distance are recommendation information to be recommended to the user;

(Continued)

and a recommendation information provision unit for providing a client device with the recommendation information.

11 Claims, 11 Drawing Sheets

(51) Int. Cl.
*G06Q 30/0201* (2023.01)
*G06Q 30/0601* (2023.01)

(56) References Cited

FOREIGN PATENT DOCUMENTS

JP      2014002492  A    1/2014
JP      2020042433  A    3/2020

OTHER PUBLICATIONS

International Search Report for PCT/JP2021/044700 mailed Feb. 15, 2022, 4 pages.
Written Opinion of the ISA for PCT/JP2021/044700 mailed Feb. 15, 2022, 6 pages.

* cited by examiner

FIG. 2
(a)
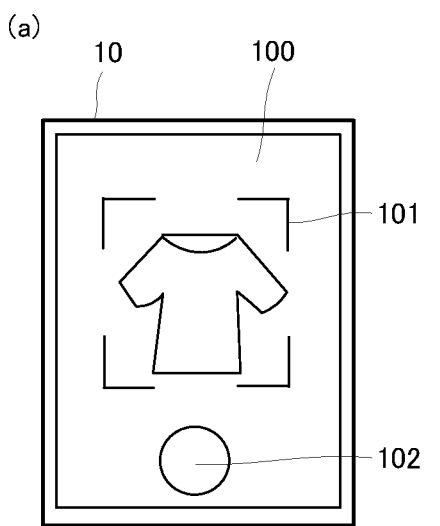
(b)
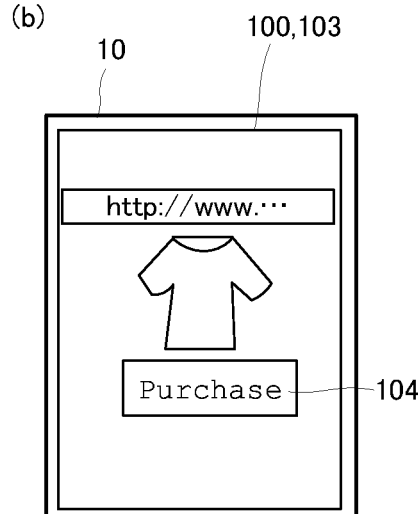
(c)
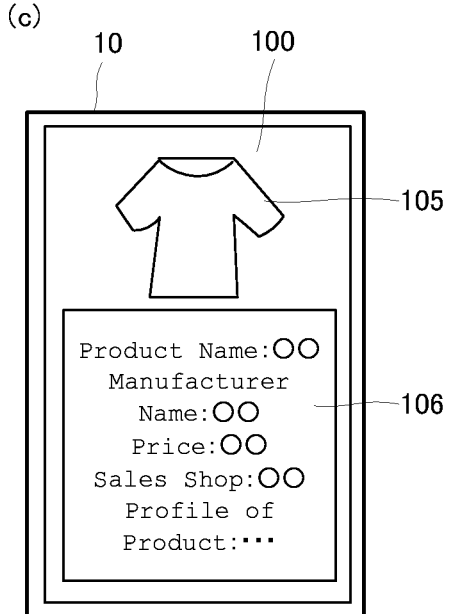
(d)
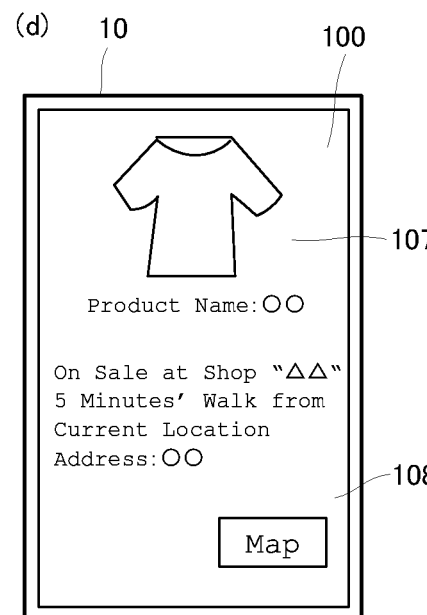

FIG. 3

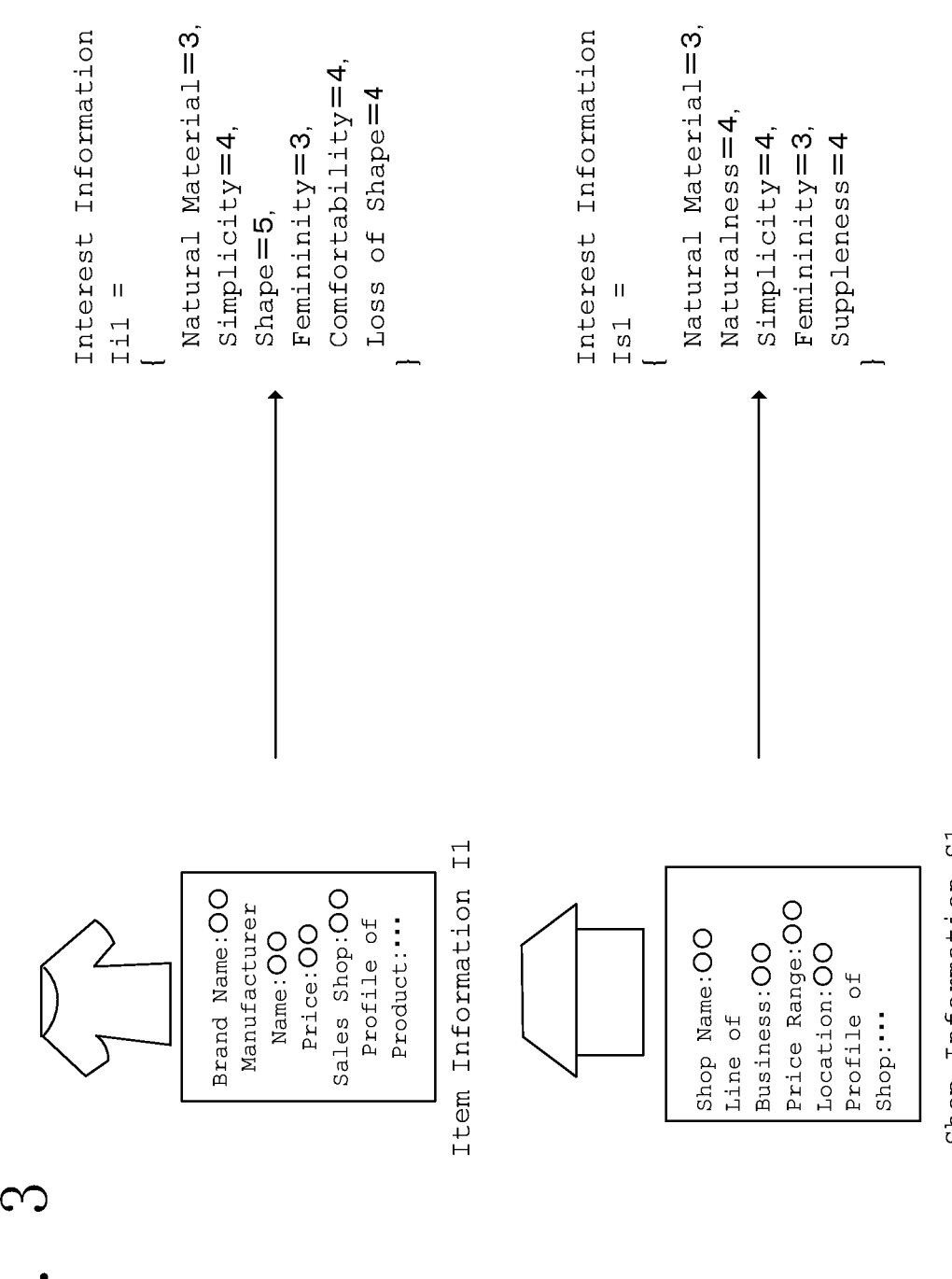

Item Information I1

Brand Name:OO
Manufacturer Name:OO
Price:OO
Sales Shop:OO
Profile of Product:⋯

Interest Information
Ii1 =
{
Natural Material=3,
Simplicity=4,
Shape=5,
Femininity=3,
Comfortability=4,
Loss of Shape=4
}

Shop Information S1

Shop Name:OO
Line of Business:OO
Price Range:OO
Location:OO
Profile of Shop:⋯

Interest Information
Is1 =
{
Natural Material=3,
Naturalness=4,
Simplicity=4,
Femininity=3,
Suppleness=4
}

Recommendation Information on Shop S1 (Shop Information)

$\vec{n}$

10

S1

S2

X

Y

Z

FIG. 11
(a)
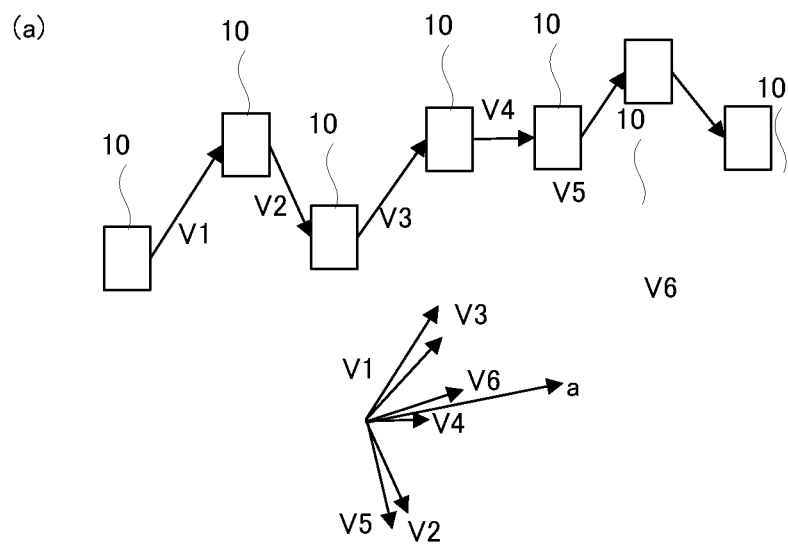
(b)
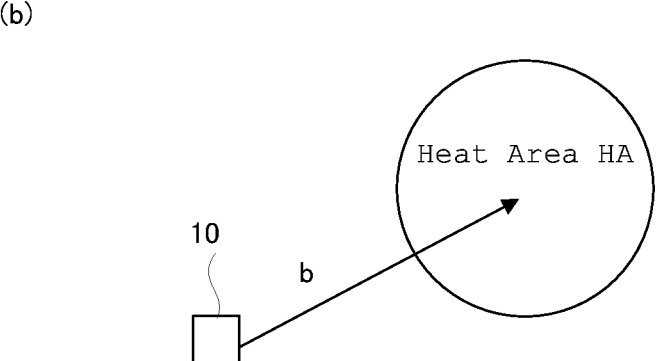
(c)
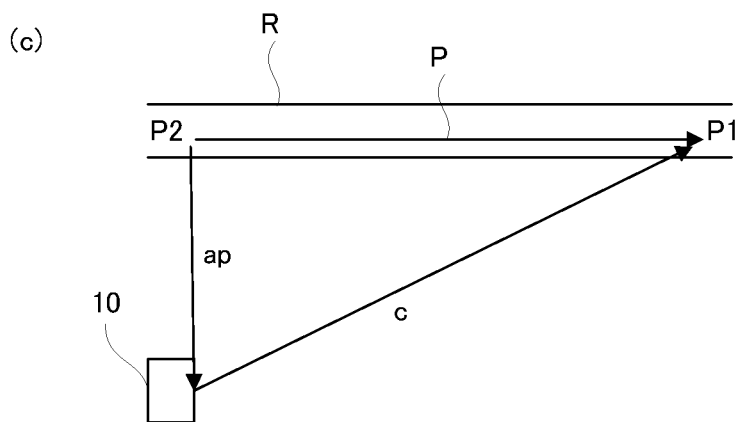

RECOMMENDATION SYSTEM, SERVER PROGRAM, AND CLIENT PROGRAM

This application is the U.S. national phase of International Application No. PCT/JP2021/044700 filed Dec. 6, 2021, which designated the U.S. and claims priority to JP Patent Application No. 2021-003755 filed Jan. 13, 2021, the entire contents of each of which are hereby incorporated by reference.

TECHNICAL FIELD

This invention relates to a recommendation system, a server program, and a client program which provide a user with recommendation information for recommending a product or a service to the user.

BACKGROUND ART

These days, it is common practice to analyze various pieces of information, such as a website browsing history, a keyword searched on a search engine, and a purchase history at a shop on the Internet, in connection with respective users, and provide information (recommendation) about a product or a service satisfying the liking of each user.

Patent Document 1, for example, discloses a technology for identifying a product and personal information, including age and sex, from an image or a video, and providing information (recommendation) concerned with a recommendable product conformed to the age and sex.

The technology according to Patent Document 1, however, provides the recommendation based on the image only, and it is difficult to say that this technology appropriately reflects the interest or concern of a user.

PRIOR ART DOCUMENTS

Patent Documents

[Patent Document 1] JP-A-2013-161116

SUMMARY OF THE INVENTION

Problems to be Solved by the Invention

The present invention has been accomplished in the light of the above-mentioned circumstances. It is an object of this invention to provide a recommendation system, a server program, and a client program which can make a recommendation reflecting the liking, interest or concern of a user.

Means for Solving the Problems

An aspect of the present invention, designed to solve the above-mentioned problems, resides in a recommendation system comprising a client device owned by a user, and a server device for providing the client device with recommendation information to be recommended to the user out of item information and shop information, wherein the server device comprises: an interest information formation means for forming interest information which is a vector obtained by digitizing a plurality of adjectives expressing the user, the item information, and the shop information; a distance calculation means for calculating a first distance between the interest information for the user and the interest information on the item information, and a second distance between the interest information for the user and the interest information on the shop information; a recommendation information determination means for determining that if the first distance meets a prescribed condition, the item information corresponding to the first distance is the recommendation information to be recommended to the user, while if the second distance meets a prescribed condition, the shop information corresponding to the second distance is the recommendation information to be recommended to the user; and a recommendation information provision means for providing the client device with the recommendation information.

Another aspect of the present invention, designed to solve the above-mentioned problems, resides in a server program for having a server device, which transmits recommendation information to be recommended to the user, out of item information and shop information, to a client device owned by a user, function as: an interest information formation means for forming interest information which is a vector obtained by digitizing a plurality of adjectives expressing the user, the item information, and the shop information; a distance calculation means for calculating a first distance between the interest information for the user and the interest information on the item information, and a second distance between the interest information for the user and the interest information on the shop information; a recommendation information determination means for determining that if the first distance meets a prescribed condition, the item information corresponding to the first distance is the recommendation information to be recommended to the user, while if the second distance meets a prescribed condition, the shop information corresponding to the second distance is the recommendation information to be recommended to the user; and a recommendation information provision means for providing the client device with the recommendation information.

Still another aspect of the present invention, designed to solve the above-mentioned problems, resides in a client program for having a client device, which receives recommendation information to be recommended to a user, out of item information and shop information, from a server device, function as: an interest collection means for collecting clip information selected by the user out of the information obtained by the client device, an action history being information representing the user's action detectable by the client device, and a purchase history being information on a product and a service purchased by the user via the client device, and transmitting the clip information, the action history, and the purchase history to the server device; and a recommendation information presentation means for receiving the recommendation information transmitted by the server device based on the clip information, the action history, and the purchase history from the server device, and displaying the recommendation information.

Effects of the Invention

According to the present invention, a recommendation system, a server program, and a client program, which can make a recommendation reflecting the liking, interest or concern of a user, are provided.

BRIEF DESCRIPTION OF THE DRAWINGS

FIGS. 2(a) to 2(d) are views showing examples of screens displayed on a smartphone.

FIG. 3 is a view showing examples of interest information formed from item information and shop information.

FIG. 4 is a view showing an example of formation of interest information for a user.

FIG. 8 is a view illustrating the narrowing-down of the item information.

FIG. 10 is a view illustrating a method for predicting the action of the user.

FIGS. 11(*a*) to 11(*c*) are views illustrating a method for predicting the actions of the user.

MODE FOR CARRYING OUT THE INVENTION

Embodiments of the present invention will be described below. Descriptions of the embodiments are intended for illustration, and the present invention is not limited to the following descriptions.

Embodiment 1

Figure 1:
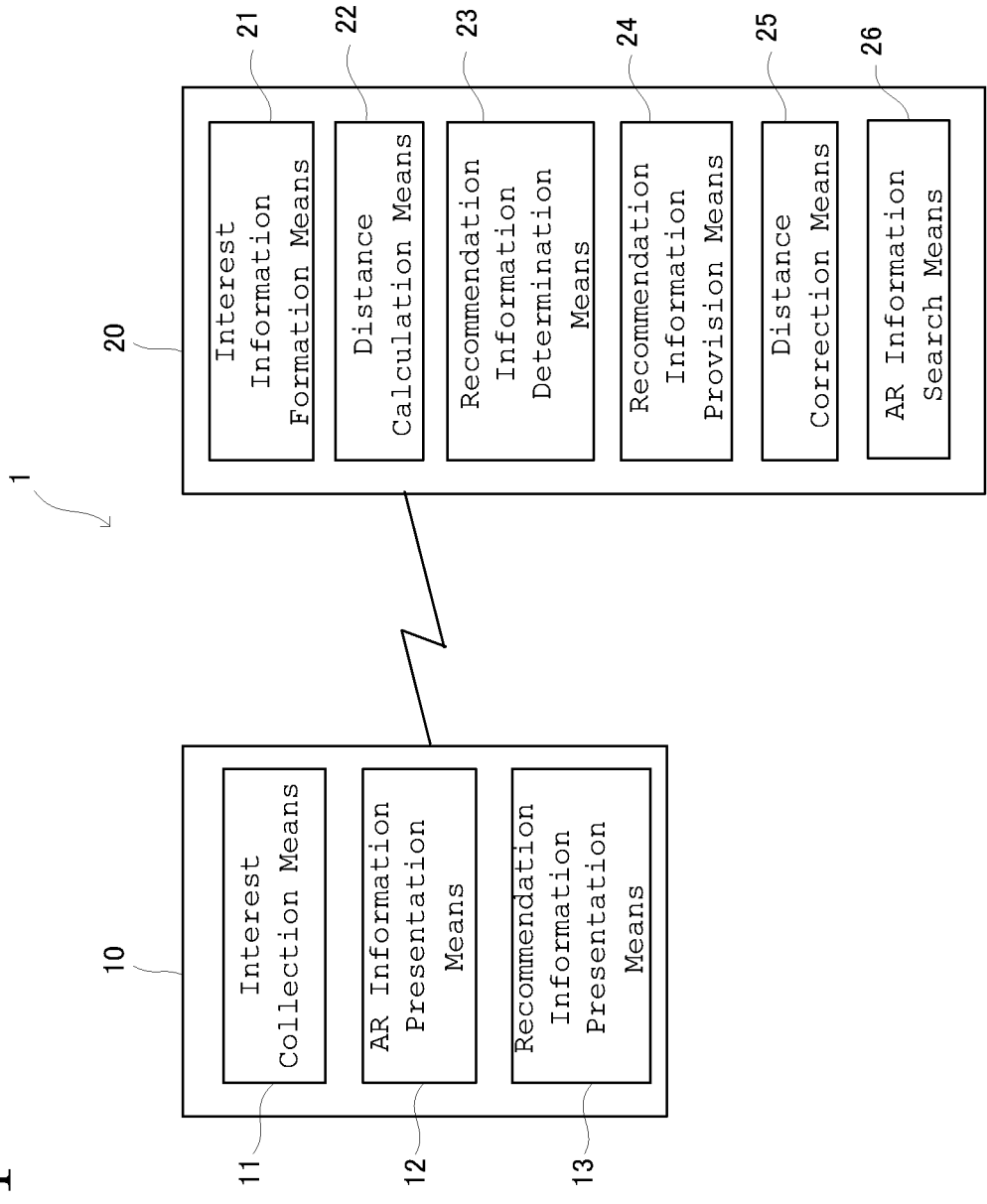
FIG. 1 is a view showing the functions of a recommendation system.

As shown in FIG. 1, a recommendation system 1 is equipped with a smartphone 10 and a server device 20 capable of communicating with each other via the Internet. The recommendation system 1 determines information to be recommended to a user out of item information which is information on a product, and shop information which is information on a shop, and provides this information to the smartphone 10 owned by the user. HTTP can be used as an example of communication mediated by the Internet. However, this is not limiting, and a proprietary protocol mounted on TCP/IP may be used. Furthermore, communication standards other than the Internet may be used.

The smartphone 10 is an example of a client device as recited in the claims of this application. It is a general mobile terminal device which has CPU, RAM, a storage device such as a flash disk, input/output devices, communication means, a camera, GPS, etc., although this is not shown, and which is carried by the user. The server device 20 is a general computer having CPU, RAM, a storage device such as a hard disk, input/output devices, communication means, etc., although this is not shown.

The storage device of the smartphone 10 has a client program installed thereon. The client program is loaded into the RAM, and executed by the CPU. The storage device of the server device 20 has a server program installed thereon. The server program is loaded into the RAM, and executed by the CPU.

Information on the users who utilize the recommendation system 1 (hereinafter will be referred to as user information) is registered with the server device 20. The user information includes ID identifying the user, and the user's password, name, address, etc. The server program and the client program transmit and receive the ID and the password, and can thereby verify that the user is registered with the recommendation system 1. By authentication of the user upon this verification, various processings to be described below can be performed for the respective users.

The storage device of the server device 20 stores the item information and the shop information. Out of the item information and the shop information, such information as to fit the user's interest or concern is selected, and provided as recommendation information to the user, as will be described in detail later.

The item information refers to information on a product, a service, or an event handled in a commercial transaction. For example, it includes the name of the product, service or event, detailed specifications or descriptions thereof, the price and category thereof, positional information thereon (information representing the position of the shop selling the product, the position of the shop or location providing the service, or the position of the place where the event is held), and image data.

The shop information refers to information on the shop or event venue where the product is sold, the service is provided, or the event is held. For example, it includes the name of the shop or event venue, positional information on the shop or event venue, detailed explanations therefor, price, category, and image data.

The item information and the shop information are stored in the storage device of the server device 20, and can be read by the server program. The item information and the shop information are configured such that if the product, service or event is designated, the shop information on the shop handling the product, the shop information on the shop providing the service, or the shop information on the event venue can be searched. Such item information and shop information may be prepared based on existing information obtainable via the Internet, or may be information which a person has prepared by observing the actual product, service, event, shop or the like.

The client program is a program for having the smartphone 10 function as an interest collection means 11, an AR information presentation means 12, and a recommendation information presentation means 13 (namely, this program is a smartphone application).

The interest collection means 11 collects information representing a target, to which the user's interest, concern or liking (hereinafter will be referred to as interest or the like) is directed, through the user's smartphone 10, and transmits this information to the server device 20. Such information representing the object of the user's interest or the like is exemplified by clip information, action history, and purchase history to be described below.

The clip information refers to a piece of information selected by the user as the object of interest or the like among pieces of information obtained by the smartphone 10. For example, when the user images an object of interest by use of the camera function of the smartphone 10, image data obtained by the imaging serves as clip information.

For example, the interest collection means 11 displays a button for calling up the camera function to the screen of the smartphone 10, although this is not illustrated. When the button is tapped by the user, the interest collection means 11 calls up the camera function of the smartphone 10, as shown in FIG. 2(*a*), to bring a photographable state. The user places an object of interest or the like (a shirt, in the example of the drawing) in a shooting frame 101 displayed on a screen 100 of the smartphone 10, and taps a shooting button 102. Once the shooting button 102 is tapped, the interest collection means 11 stores image data formed by the camera function of the smartphone 10 as clip information.

The image data thus obtained by the camera function may be used as the clip information. Alternatively, image data already obtained by imaging may be selected by the user, and the selected image data may be used as the clip information.

Generally, applications executed by the smartphone 10 function such that information handled by each application is shared with other applications. Using such a sharing function, information handled by an application other than the client program executed by the smartphone 10 may be used as the clip information.

As an example of the other application, a browser is named. The user allows a website viewed in the browser to be shared with the client program (interest collection means 11) with the use of the sharing function. The interest collection means 11 stores information on the website obtained from the browser (e.g., URL or information such as character data (in HTML format or the like) or video image indicated by the URL) as the clip information.

It goes without saying that the client program (interest collection means 11) may obtain information handled by the application other than the browser with the help of the sharing function, and use the information as the clip information. In the case of an application of social media, for example, the user allows articles or comments viewed using the application, or information on other users in contact on social media, to be shared with the client program (interest collection means 11) as objects of interest by the sharing function. The client program (interest collection means 11) stores those articles, comments, etc. as the clip information.

The action history refers to information representing the user's actions in reality, and can be detected by the smartphone 10. As a concrete example of the action history, information representing the user's visit to an actual shop is named. If a current position obtained by GPS of the smartphone 10 lies within a certain range from the location of the shop, the interest collection means 11 regards the user as having visited the shop. Then, the interest collection means 11 stores information representing the shop visited by the user, and the date and time of the visit as the action history.

The purchase history refers to information on a product or service actually purchased by the user. As shown in FIG. 2(b), for example, the interest collection means 11 displays a browser 103 on the screen 100 of the smartphone 10. Assume that when the user operates the browser 103 to view a mail order site, the user taps a purchase button 104 to make a purchase actually. In this case, the interest collection means 11 stores "the product as an object of purchase using the purchase button 104", "the date and time of the purchase", etc. as the purchase history. Of course, the purchase history is not limited to one obtained through the browser 103, and may be obtained, for example, through a dedicated application for access to a mail order site.

The interest collection means 11 associates the clip information, action history and purchase history, which have been collected in the above manner, with the user, and transmits them to the server device 20. The clip information, action history and purchase history thus transmitted are associated with the user, who is the owner of the smartphone 10 being the transmission source, and recorded in the storage device of the server device 20. The interest collection means 11 can also delete the already collected clip information, etc. in accordance with the user's operation. Concretely, the interest collection means 11 displays the already registered clip information via a user interface displayed on the smartphone 10, and selects the clip information, etc., as the object of deletion, in accordance with the user's operation. Then, the interest collection means 11 communicates to the server device 20 the fact that the selected clip information, etc. are the object of deletion. The server device 20 deletes the clip information, etc.

The AR information presentation means 12 transmits the clip information, which has been stored by the interest collection means 11 based on the user's operation, to the server device 20, and also presents AR information received from the server device 20.

The AR information refers to information on a body or the like imaged as image data stored as the clip information. The image data on the shirt imaged in FIG. 2(a), coupled with image data 105, is presented onto the screen 100 together with AR information 106 comprising the manufacturer of the shirt, its brand name, the main point of its sale, its price, etc., as shown in FIG. 2(c). The user simply shoots the object of interest, whereby the user can obtain the AR information on that object. The method of obtaining the AR information corresponding to the clip information in the server device 20 will be described later.

The recommendation information presentation means 13 transmits the current position, which has been acquired by GPS possessed by the smartphone 10, to the server device 20. From the server device 20, item information and shop information at a location near the current position, are sent as recommendation information, and the recommendation information is displayed on the screen 100. The recommendation information refers to item information and shop information assumed to be an object of interest or the like for the user.

Assume that as shown in FIG. 2(d), the user acts while carrying the smartphone 10, and comes to a place close to the shop or location where a product, service or event assumed to draw the interest of the user is provided. On this occasion, the recommendation information presentation means 13 displays, on the screen 100, item information 107 (information on the shirt) highly likely to draw the user's interest, and shop information 108 on the shop actually handling the product targeted by the item information, as the recommendation information transmitted from the server device 20.

The drawing shows the item information 107 on the shirt highly likely to draw the user's interest (or the shirt itself regarded as the object of interest or the like by the interest collection means 11). It also shows the shop information 108 on the actual shop handling the product or the like shown as the item information 107.

The timing when the recommendation information presentation means 13 presents the recommendation information onto the screen 100 is when the shop or the like handling the product or the like highly likely to draw the user's interest or the like lies within a prescribed range from the position of the smartphone 10. The recommendation information may be presented once or a plurality of times. Details of the reception or transmission of the recommendation information from or to the server device 20 will be offered later.

According to the smartphone 10 as described above, the item information on the product or the like highly likely to draw the user's interest or the like, and the shop information on the shop handling the product or the like can be provided to the user in the vicinity of the shop handling the product or the like.

In general terms, the user operates the smartphone 10 and approaches an object of interest or the like from among various pieces of information. However, it is rare for the user to take an immediate action out of interest or the like in order to touch the object actually. In some cases, the user may forget having interest or the like. That is, there is a time gap between a timing when the user has an interest or the like in the product or the like and a timing when the user actually touches the product or the like. Thus, it can occur that the user does not touch the product or the like actually, although the user has felt an interest or the like.

However, the smartphone 10 provides the above-mentioned recommendation information, when the user is at a place near the shop or the like handling the product or the like which has attracted the user's interest or the like. As a result, the user is reminded of the product or the like having attracted the user's interest or the like in the past, and can be strongly motivated to touch the product or the like actually.

From the user's point of view, when the user is acting while carrying the smartphone 10, the user gains the advantage of feeling it easy to actually touch the product or the like having attracted the user's interest in the past. From the viewpoint of interpreting the recommendation information as an advertisement for the product or the like, the possibility that the user will actually visit the shop or the like with interest or the like and buy the product or the like can be enhanced. Hence, the excellent advertising effect of easily leading to the user's buying action in comparison with a conventional advertisement provided by a browser or the like is exhibited.

The server program is a program which allows the server device 20 to function as an interest information formation means 21, a distance calculation means 22, a recommendation information determination means 23, a recommendation information provision means 24, a distance correction means 25, and an AR information search means 26.

The interest information formation means 21 forms interest information in regard to each of the user information, the item information and the shop information. The interest information is an n-dimensional vector obtained by digitizing a plurality of adjectives. The adjectives are selected for characterizing the user information, the item information and the shop information. Digitization of the adjective refers to imparting a discrete or continuous numerical value conformed to the degree of the adjective.

Using FIG. 3, the method of forming the interest information will be described. The formation of the interest information from the item information and the shop information is performed, for example, in the following manner:

For example, an information processing device different from the server device 20 (e.g., a personal computer) displays on its screen a form for inputting the interest information. A person looks at a name, descriptive text, price, and image constituting the item information, determines adjectives to be attached to the product or the like targeted by the item information, and their numerical values, and inputs them to the above form. By such manual work, the interest information composed of vectors conformed to the number of the adjectives is formed for one piece of item information in the above information processing device. For the shop information as well, interest information is formed in the same manner.

In the example shown in FIG. 3, item information I1 is one piece of information on a shirt among a plurality of pieces of item information stored in the server device 20. It is composed of the brand name, manufacturer name, price, sales store, profile of product, and image data on the shirt. Based on such item information I1, adjectives characterizing the item information I1 are selected as appropriate, and these adjectives are digitized. In this example, the adjectives are "natural material", "simplicity", "shape", "femininity", "comfortability", and "loss of shape". To represent the degree of each of these adjectives, digitization is performed. For example, digitization on a scale of 1 to 5 is performed. For the respective adjectives, numerical values "3, 4, 5, 3, 4, 4" are assigned. The greater any of the numerical values is, the higher the degree of the adjective is. For example, a higher value of "natural material" means that the shirt in question is composed of the natural material to a higher degree. A higher value of "shape" means that the shirt is in a better shape.

Shop information S1 is a piece of information on a specific shop among a plurality of pieces of shop information stored in the server device 20. It is composed of the name of a shop, its line of business, price range, location, shop profile, image data on shop appearance, etc. Based on such shop information S1, interest information Is1 is prepared. In this example, the adjectives are "natural material", "naturalness", "simplicity", "femininity", and "suppleness". For the respective adjectives, numerical values "3, 4, 4, 3, 4" are assigned.

As shown in the above examples, different adjectives are used for the item information and the shop information. However, common adjectives may be used. Moreover, common adjectives may be used for a plurality of pieces of item information, or different adjectives may be used for different pieces of item information. The same can be said of shop information. There are no limits to the number of adjectives constituting the interest information. Different numbers of adjectives may be used, or the same number of adjectives may be used, for the item information and the shop information. Furthermore, the same number of adjectives may be used for a plurality of pieces of item information, or the number of adjectives may be different for each different piece of item information. The same holds true of shop information.

The aforementioned information processing device transmits the so formed interest information to the server device 20 via a communication means such as the Internet or a removable storage medium, and the server device 20 makes its storage device store the received interest information. Of course, the interest information may be formed by the server device 20, or may be formed by any information processing device such as a tablet other than a personal computer.

The interest information is not limited to the one obtained by the manual operation, but may be formed by machine learning. For example, the interest information prepared manually as described above is used as teacher data, and the item information or the shop information, based on which the interest information has been obtained, is used as an input value. Using the teacher data and the input value, machine learning is performed to form a learning model. By providing the resulting learning model with item information or shop information for which interest information is unknown, interest information can be obtained.

Next, the method of forming interest information related to the user will be described using FIG. 5. As described earlier, the clip information, action history, and purchase history transmitted from the interest collection means 11 of the smartphone 10 are recorded in the storage device of the server device 20. The interest information formation means 21 forms interest information for the user from the clip information, action history, and purchase history concerned with the user.

The clip information, as described above, mainly comprises image data on the product, shop, event, etc. as targets attracting the user's interest or the like. The interest information formation means 21 performs image matching between the image data included in the clip information and the image data included in the item information and the shop information, and extracts the item information or shop information that has matched. Such matching between the pieces of image data can be performed using a publicly known method. Although its details are omitted herein, the matching can be performed by extracting feature quantities from those pieces of image data, comparing the feature quantities to find a difference, and determining whether or not the difference is a prescribed value or lower.

Such extraction of the item information or the like from the image data is not limiting. For example, the interest information formation means 21 may extract the item information or shop information by searching information composed of characters, such as a product name, included in the item information or shop information to retrieve information coincident with information composed of characters, such as a product name, included in the clip information.

In the same manner as the above method of extraction of item information or shop information from the clip information, the interest information formation means 21 extracts item information or shop information in regard to the action history or purchase history as well. In the example shown in FIG. 4, item information 12 is extracted from the clip information, shop information S1 is extracted from the action history, and item information 13 is extracted from the purchase history.

The interest information formation means 21 carries out predetermined computations on pieces of interest information formed for the respective pieces of item information and shop information extracted as above, thereby forming interest information for the user. The predetermined computation is exemplified by a method comprising averaging the resulting pieces of interest information for respective elements, and using a vector, whose element is the resulting average value, as interest information for the user.

Figure 4:
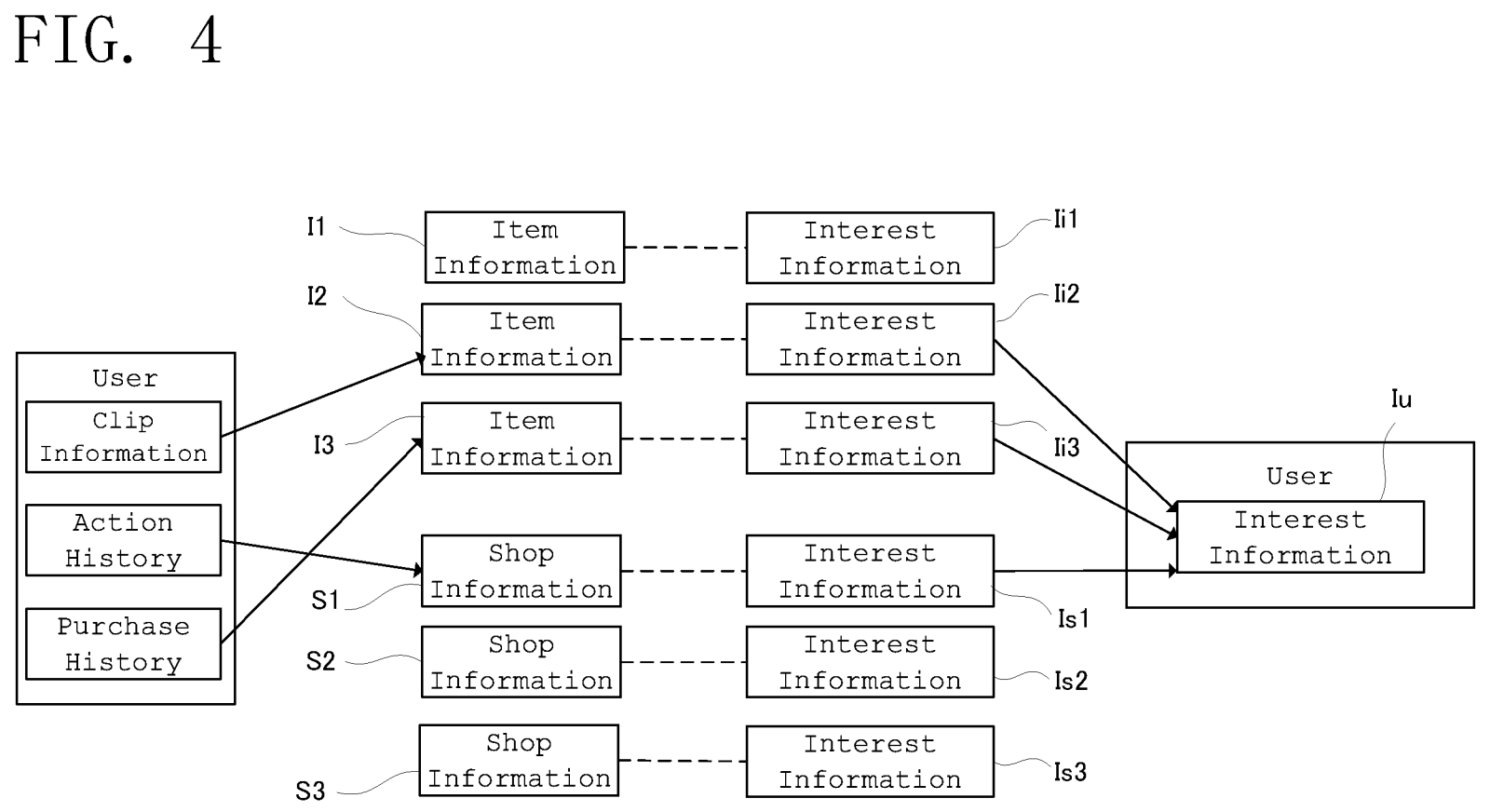

In the example shown in FIG. 4, predetermined computations are performed on interest information Ii2, interest information Ii3, and interest information Is1. Let each element of interest information Ix (the digitized form of an adjective) be $a(x)i$ ($i=1$ to n; the maximum number of elements among all pieces of interest information). Then, the interest information is expressed as follows:

$$Ii2=\{a(i2)1, a(i2)2, \ldots, a(i2)n\}$$

$$Ii3=\{a(i3)1, a(i3)2, \ldots, a(i3)n\}$$

$$Is1=\{a(s1)1, a(s1)2, \ldots, a(s1)n\}$$

Interest information Iu for the user is obtained in the following manner, if the predetermined computation is designed to give the average of the respective elements of the above pieces of interest information:

$$Iu=\{\text{average of } a(i2)1 \cdot a(i3)1 \cdot a(s1)1, \text{ average of } a(i2)$$
$$2 \cdot a(i3)2 \cdot a(s1)2, \ldots, \text{ average of } a(i2)n \cdot a(i3)n \cdot a$$
$$(s1)n\}$$

The interest information on the item information and that on the shop information may use different adjectives, or may be different in number. In this case, the predetermined computation is performed on the elements of the same adjective. For example, if "a(i2)1" is an element obtained by digitizing "natural material", "a(i3)1" and "a(s1)1" are also elements obtained by digitizing "natural material". If the interest information Ii3 does not include an element obtained by digitizing "natural material", numerical values are complemented appropriately, for example, by nullifying "a(i3)1".

The means for realizing in the server device 20 the above-mentioned respective functions, such as a function of inputting interest information via the form of the image processing device, a function of transmitting the interest information to the server device 20, a function of forming the above learning model, a function of obtaining interest information with the use of the learning model, and a function of forming interest information for the user from clip information, etc., corresponds to the interest information formation means 21.

The distance calculation means 22 calculates a first distance between the interest information for the user and the interest information about the item information, and a second distance between the interest information for the user and the interest information about the shop information. The distance between these pieces of interest information is a yardstick representing the nearness of the two pieces of interest information, and can employ, for example, Euclidean distance or cosine similarity.

Figure 5:
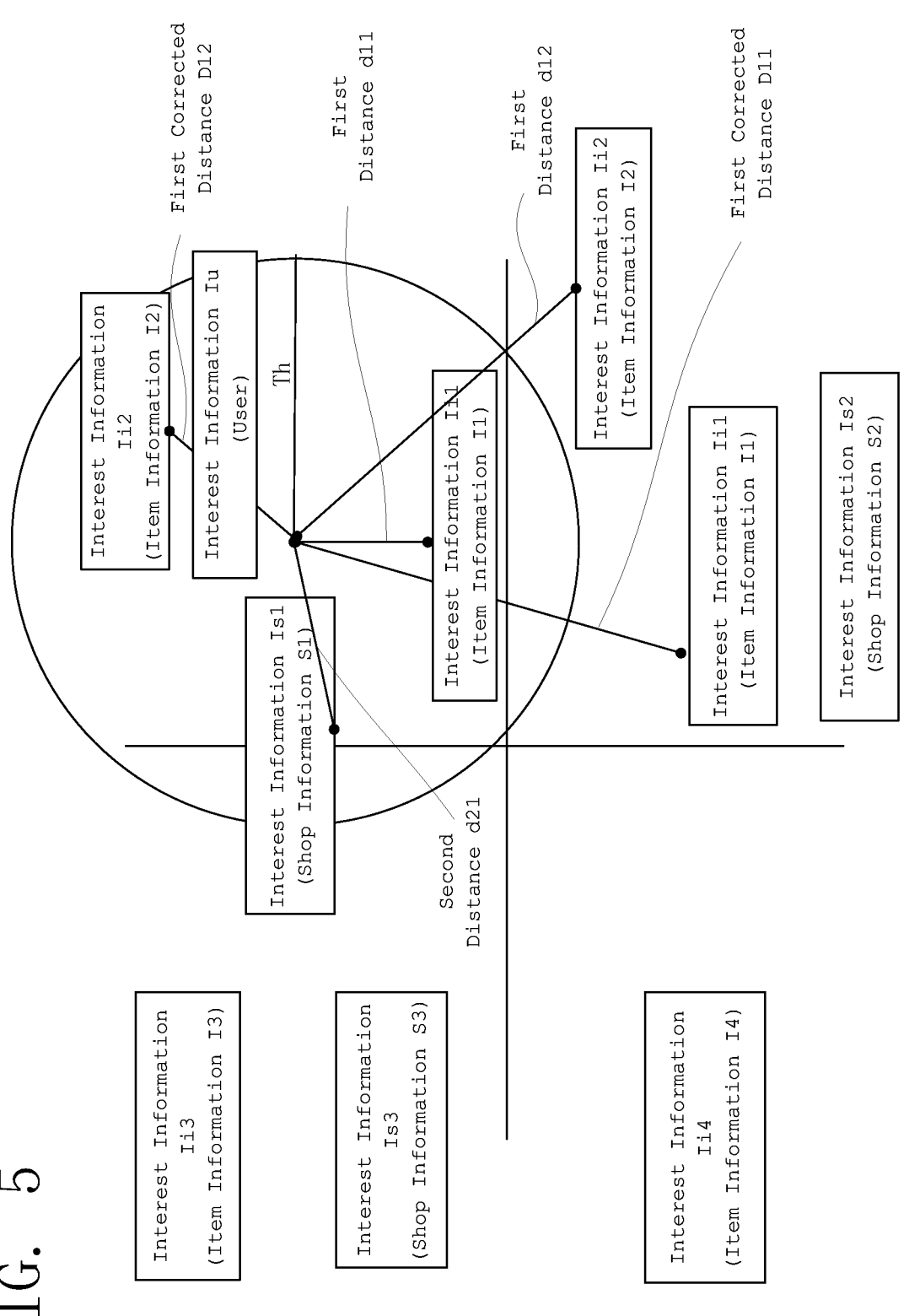
FIG. 5 is a view showing positional relationships among pieces of interest information concerned with the user, the item information and the shop information.

If the interest information is a two-dimensional vector, for example, as shown in FIG. 5, the pieces of interest information, Iu, Ii1 to Ii4, and Is1 to Is3, about the user, the item information, and the shop information can be plotted on a two-dimensional plane. First distances d11 to d14 (only d11 is shown) are the distances from the interest information Iu for the user to the pieces of interest information Ii1 to Ii4 about the item information. On the other hand, second distances d21 to d23 (only d21 is shown) are the distances from the interest information Iu for the user to the pieces of interest information Is1 to Is3 about the shop information.

The interest information Iu for the user is formed based on clip information, etc. in which the user is interested. Thus, the pieces of item information targeted by the pieces of interest information Ii1 to Ii4 are more likely to interest the user, as the first distance is shorter. Similarly, the pieces of shop information targeted by the pieces of interest information Is1 to Is3 are more likely to interest the user, as the second distance is shorter.

If the first distance falls under a prescribed condition, the recommendation information determination means 23 determines that the item information corresponding to the first distance is the recommendation information to be recommended to the user. If the second distance falls under a prescribed condition, moreover, the recommendation information determination means 23 determines that the shop information corresponding to the second distance is the recommendation information to be recommended to the user.

The prescribed condition can be, for example, that the first distance is smaller than a threshold value set for the first distance. An alternative prescribed condition can be that if the first distances are arranged in an ascending order, the first distance should rank at a predetermined or higher position from the top. The same prescribed condition can be applied to the second distance. The prescribed condition applied to the first distance and the prescribed condition applied to the second distance may be the same or different.

Assume, for example, that the prescribed condition is that the first distance and the second distance are each at a threshold value Th or less (within a circle with a radius of Th). In this case, the first distance d11 and the second distance d21 fulfill the prescribed condition.

If, as the prescribed condition, the first distance among the first distances arranged in the ascending order ranks within the second place from the top, all the first distances arranged in the ascending order are . . . d14, d13, d12 and d11. Of these first distances, the top two first distances d11 and d12 fulfill the prescribed condition. If the same prescribed condition is applied to the second distance as well, the second distance d21 and the second distance d22 fulfill the prescribed condition.

If the first distance d11 is taken as an example fulfilling the prescribed condition, the recommendation information determination means 23 determines that the item information I1 serving as a base for the interest information Ii1 corresponding to the first distance d11 should be taken as recommendation information. Similarly, if the second distance d21 is taken as an example fulfilling the prescribed condition, the recommendation information determination means 23 determines that the shop information S1 serving as a base for the interest information Is1 corresponding to the second distance d21 should be taken as recommendation information.

The recommendation information provision means 24 provides the recommendation information to the smartphone 10 owned by the user. The timing for providing the recommendation information is not particularly limited. However, a preferred timing is when the position of the positional information on the item information or shop information included in the recommendation information lies within a predetermined range from the current position of the smartphone 10.

Figure 6:
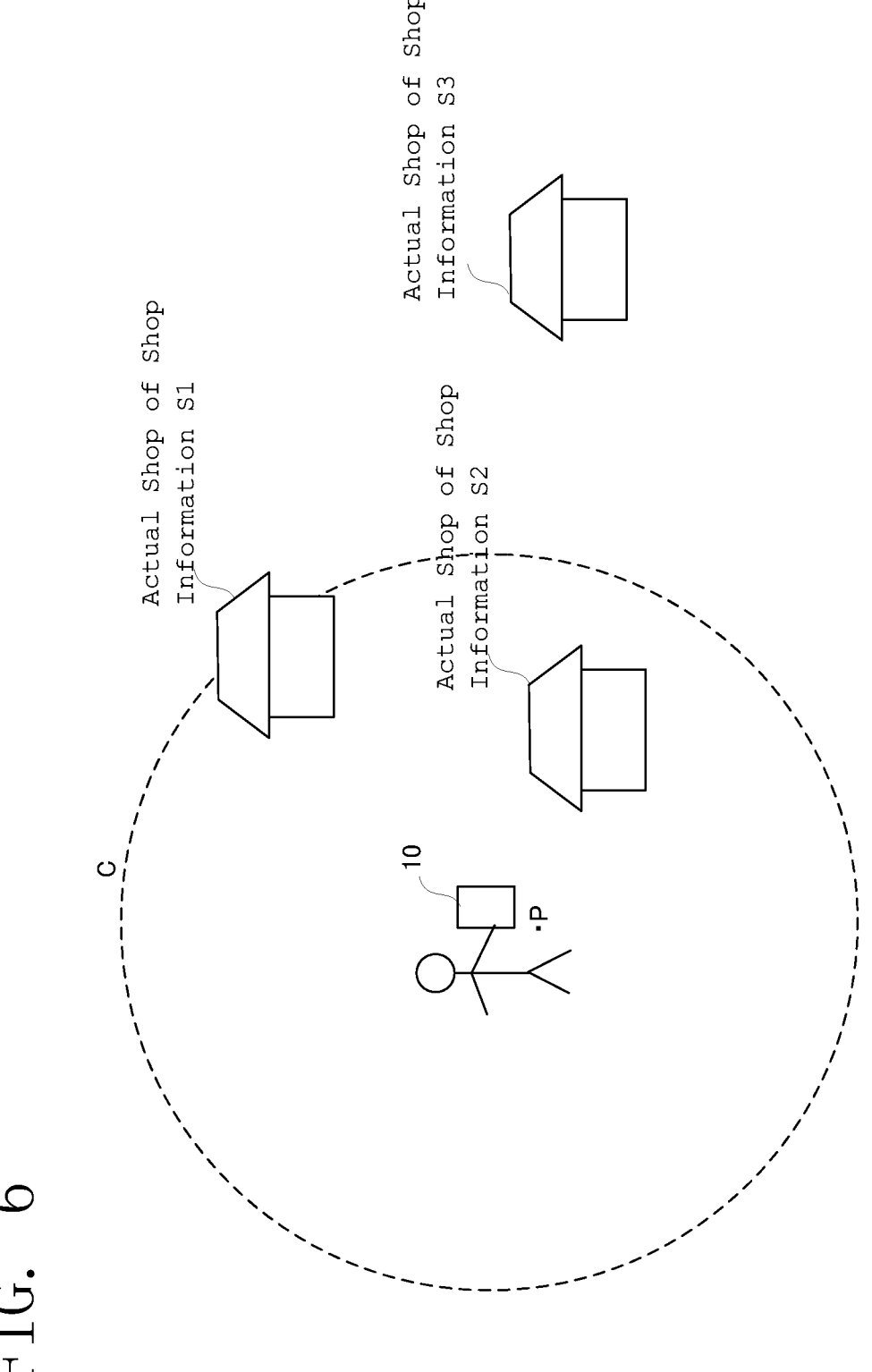
FIG. 6 is a view showing a positional relationship between the smartphone and shops when the smartphone is provided with recommendation information.

As shown in FIG. 6, the recommendation information provision means 24 receives the position P of the smartphone 10 sent from the recommendation information presentation means 13 of the smartphone 10.

On the other hand, the recommendation information presentation means 13 searches, among the pieces of shop information obtained as the recommendation information by the recommendation information determination means 23, shop information related to positional information on the shop present within a predetermined range C centering around the position P received from the smartphone 10. As a result, the shop information S1 is retrieved. The recommendation information provision means 24 transmits the retrieved shop information S1, as recommendation information, to the smartphone 10.

Even if a plurality of shops (shop information S1, shop information S2) are present within the predetermined range C from the smartphone 10, only the shop information S1 highly likely to attract the user's interest is provided to the smartphone 10 of the user.

The distance correction means 25 corrects the first distance and the second distance based on the user's interest or the like. Corrected forms of the first distance and the second distance are designated as the first corrected distance and the second corrected distance. The first corrected distance is obtained by making a correction in such a manner that the higher degree of interest the user has in the item information, the basis for calculation of the first distance, the shorter the first distance becomes. The second corrected distance is obtained by making a correction in such a manner that the higher degree of interest the user has in the shop information, the basis for calculation of the second distance, the shorter the second distance becomes.

Figure 7:
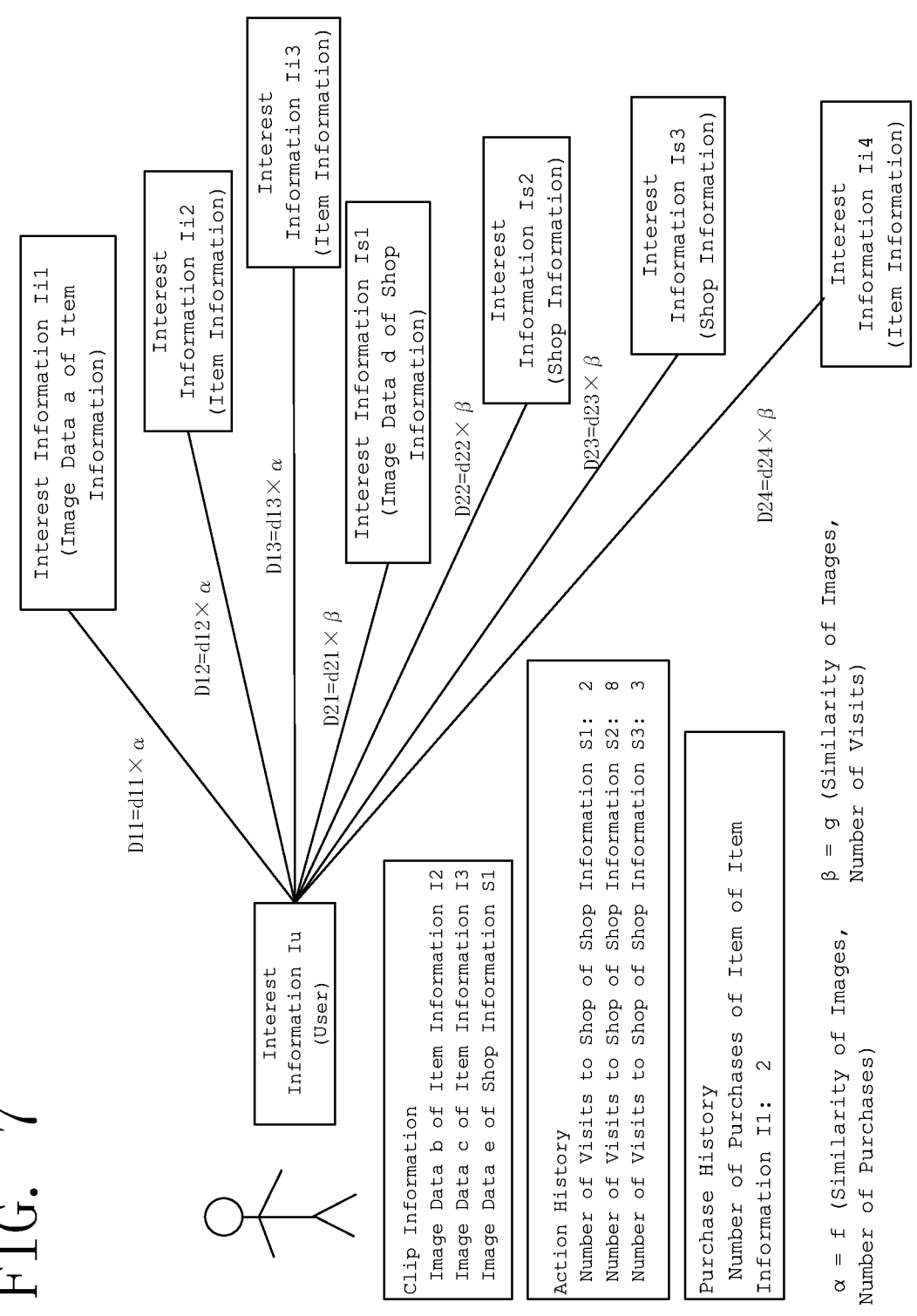
FIG. 7 is a view for illustrating corrections to distances between the pieces of interest information.

Concrete examples of such corrections will be described using FIG. 7. The distance correction means 25 corrects the first distances d11 to d13 based on the image data of the item information stored as the clip information, and the purchase history. Hereinafter, the correction on the first distance d11 will be explained, and the corrections on the first distances d12 to d13 are made in the same manner as explained there.

The distance correction means 25 calculates the degree of similarity between the image data a of the item information, which is the basis for calculation of the first distance d11, and the image data b, c of the pieces of item information 12, 13 stored as the clip information. Since the degree of similarity of the image data can be obtained by a publicly known method, its detailed description will be omitted. In this case, the degree of similarity between the image data a and the image data b, and the degree of similarity between the image data a and the image data c are obtained, and the highest degree of similarity, for example, is selected.

The distance correction means 25 also retrieves the number of purchases of the item corresponding to the item information I1 from the user's purchase history by means of the storage device.

In the distance correction means 25, a function f for outputting a coefficient α, which makes the first distance d11 smaller as the degree of similarity heightens, and as the number of purchases increases, has been defined, with the degree of similarity of the images and the number of purchases being used as parameters. The distance correction means 25 multiplies the first distance d11 by the coefficient α, which is obtained by giving the degree of similarity of the image and the number of purchases to the function f, to calculate the first corrected distance D11. The first distances d12 to d13 are also treated in the same manner to be able to obtain the first corrected distances D12 to D13.

Assume, for example, that the degree of similarity between the image data b or the image data c and the image data a is high. Since the image data b or the image data c is stored as the clip information in which the user has shown an interest or the like, the item of the image data a is expected to be highly likely to interest the user. If the degree of similarity of the images is high, as noted above, the coefficient α making the first distance d11 small is calculated by the function f. If the number of purchases is large, moreover, the item information on the object to be purchased is expected to be highly likely to interest the user. If the number of purchases is great, as noted above, the coefficient α making the first distance d11 small is calculated by the function f.

Next, the correction on the second distance by the distance correction means 25 will be described. The distance correction means 25 corrects the second distances d21 to d24 based on the image data of the shop information stored as the clip information, and the action history. Hereinafter, the correction on the second distance d21 will be explained, and the corrections on the second distances d22 to d24 are made in the same manner as explained there.

The distance correction means 25 calculates the degree of similarity between the image data d of the shop information, which is the basis for calculation of the second distance d21, and the image data e of the shop information S1 stored as the clip information. Since the degree of similarity of the image data can be obtained by a publicly known method, its detailed description will be omitted. If a plurality of pieces of shop information are present as the clip information, the highest degree of similarity is selected as in the case of the correction on the first distance.

The distance correction means 25 also retrieves the number of visits to the shops corresponding to the pieces of shop information S1 to S3 from the user's action history by means of the storage device.

In the distance correction means 25, a function g for outputting a coefficient β, which makes the second distance d21 smaller as the degree of similarity heightens, and as the number of visits increases, has been defined, with the degree of similarity of the images and the number of visits being used as parameters. The distance correction means 25 multiplies the second distance d21 by the coefficient β, which is obtained by giving the degree of similarity of the image and the number of visits to the function g, to calculate the second corrected distance D21. The second distances d22 to d24 are also treated in the same manner to be able to obtain the second corrected distances D22 to D24.

Assume, for example, that the degree of similarity between the image data d and the image data e is high. Since the image data e has been stored as the clip information in which the user has shown an interest or the like, the shop information of the image data d is expected to be highly likely to interest the user. If the degree of similarity of the images is high, as noted above, the coefficient β making the second distance d21 small is calculated by the function g. If the number of visits is large, moreover, the shop information on the shop visited is expected to be highly likely to interest the user. If the number of visits is great, as noted above, the coefficient β making the second distance d21 small is calculated by the function g.

The function f is not limited to the one described above. For example, only the degree of similarity of the images may be adopted as a parameter, or only the number of purchases may be used as a parameter. The function g is not limited to the one described above. For example, only the degree of similarity of the images may be adopted as a parameter, or only the number of visits may be used as a parameter. Besides, the image data of the item information or shop information having a relatively new date and time when it was added as clip information may be used. Furthermore, the function may be a fixed one, or may be obtained by machine learning.

By making the above-mentioned correction, the first distance or second distance between the interest information on the item information or shop information and the user's interest information Iu becomes smaller, as the former interest information has a higher possibility for attracting the user's interest. The recommendation information determination means 23 determines the recommendation information based on whether or not the first corrected distance and the second corrected distance resulting from the corrections by the distance correction means 25 fulfill the prescribed conditions.

As shown in FIG. 5, for example, the first corrected distance D11 (a corrected form of the first distance d11) about the interest information Ii1 is outside the threshold value Th, so that this information is not determined to be recommendation information. On the other hand, the first corrected distance D12 (a corrected form of the first distance d12) about the interest information Ii2 is within the threshold value Th, so that this information is determined to be recommendation information. By making corrections on the first distance and the second distance, as shown here, the information highly likely to attract the user's interest or the like becomes highly likely to be judged by the recommendation information determination means 23 as being recommendation information. By contrast, the information less likely to attract the user's interest or the like is not judged by the recommendation information determination means 23 as being recommendation information.

The correction by the distance correction means 25 is made after the first distance and the second distance are obtained. This correction is also made when the clip information and action history on the user have been added, changed or deleted. The addition, change or deletion of the clip information or the like on the user means that the user's interest or the like has been changed. In other words, in accordance with a change in the user's interest or the like, the first distance and the second distance are corrected. Hence, according to the distance correction means 25, the recommendation information following the change in the user's interest or the like can be provided.

The AR information search means 26 receives the image data, one of the pieces of clip information transmitted from the smartphone 10, identifies a body imaged in the image data, and further transmits information on the body to the smartphone 10 (AR information presentation means 12) as AR information.

Figure 8:
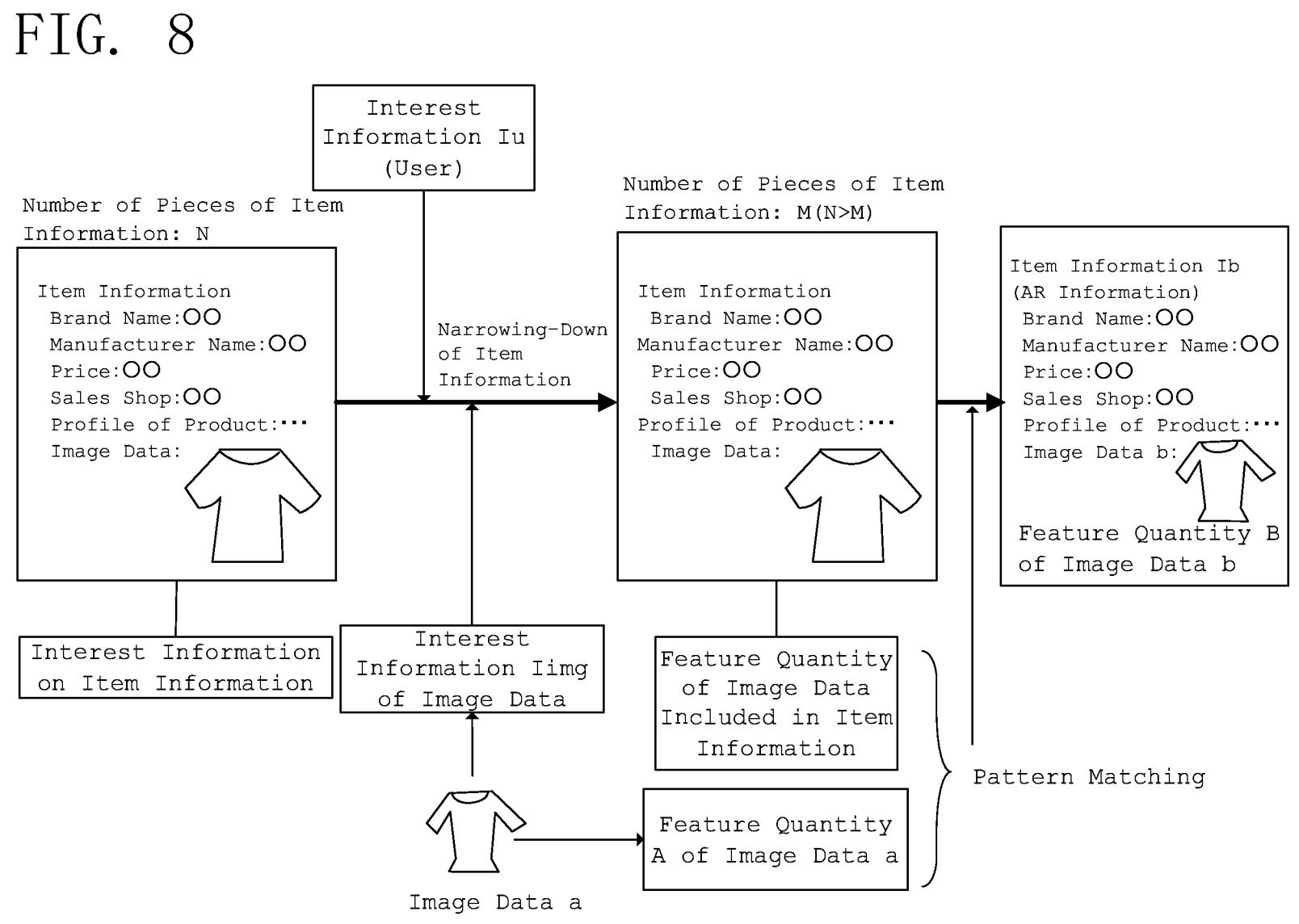

Using FIG. 8, processing for obtaining AR information from the image data will be explained. Assume that N pieces of item information are stored in the storage device of the server device 20. For the image data included in each piece of item information as well, a body is extracted by image processing, and its feature quantity is extracted. For the N pieces of item information, respective pieces of interest information are formed by the interest information formation means 21.

Then, the AR information search means 26 narrows down the pieces of item information by use of the user's interest information Iu. Concretely, the AR information search means 26 calculates the distance between the user's interest information Iu and the interest information Ii on each piece of item information. This distance can be obtained in the same manner as described in connection with the distance calculation means 22. That is, the AR information search means 26 allows the item information or shop information, which is determined as recommendation information as shown in FIG. 5, to be used as an object of subsequent processing.

Then, the AR information search means 26 forms interest information Iimg by the interest information formation means 21 in regard to the image data a. Then, the AR information search means 26 calculates the distance between each piece of interest information Ii on the item information narrowed down previously and the interest information Iimg. This distance can be obtained in the same manner as described in connection with the distance calculation means 22. The AR information search means 26 allows the item information, for which this distance is a predetermined value or less, to be used as an object of subsequent processing. As a result, the pieces of item information are narrowed down to M pieces (N>M).

Then, the AR information search means 26 receives the image data a (clip information) from the smartphone 10, performs image analysis for extracting a body imaged in the image data a, and extracts a feature quantity A about the body. Since the image analysis and the extraction of the feature quantity of the body are publicly known, their detailed explanations will be omitted.

The AR information search means 26 performs pattern matching between each of the M feature quantities of the image data included in the pieces of item information and the feature quantity A of the image data a. Since the pattern matching between the feature quantities of these pieces of image data is performed by a publicly known method, its detailed explanation will be omitted.

The AR information search means 26 obtains item information Ib including image data of a feature quantity B pattern-matched to the feature quantity A as a result of the pattern matching. The AR information search means 26 transmits the item information Ib, as AR information, to the smartphone 10.

In the above-mentioned manner, the AR information search means 26 can retrieve the item information Ib including the image data matching the image data a, based on the feature quantity of the image data a. Thus, the user simply images the body attracting the user's interest, thereby becoming able to know item information on the body, such as its product name and manufacturer.

The AR information search means 26 also narrows down the number of the pieces of item information, the object of pattern matching, by the interest information Iu and the interest information Iimg, before performing pattern matching of the feature quantities of the image data. By so doing, the amount of calculation required for the pattern matching can be cut down markedly. Furthermore, the interest information Iu and the interest information Iimg are closely related to the user's interest. Thus, the item information narrowed down by them is very likely to attract the user's interest, and can provide item information (AR information) useful to the user.

The case in which the one piece of item information, Ib, was obtained as a result of pattern matching has been explained above, but this case is not limiting. Even if a plurality of pieces of item information are obtained by pattern matching, all or some of these plural pieces of item information may be used as AR information. Furthermore, the AR information search means 26 targets the item information, but can perform processing similarly even if it targets shop information. Although the narrowing-down using the interest information Iu and the interest information Iimg has been performed, moreover, such narrowing-down need not be performed.

Figure 9:
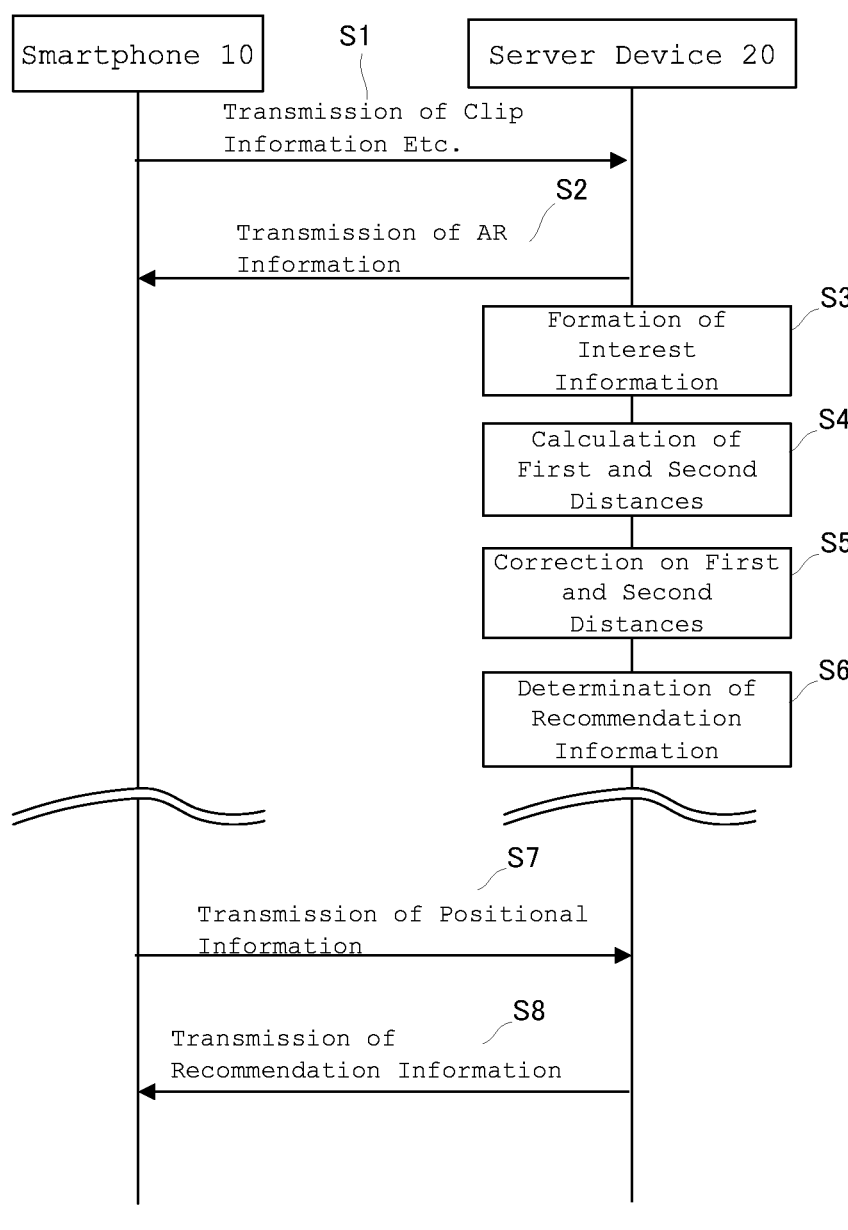
FIG. 9 is a view illustrating the flow of processings in the recommendation system.

The flow of the above-described processings in the recommendation system 1 composed of the smartphone 10 and the server device 20 will be explained using FIG. 9.

The interest collection means 11 forms clip information, etc. based on the operation of the smartphone 10 by the user, and transmits them to the server device 20 (Step S1). In the server device 20, the AR information search means 26 searches AR information based on the clip information, etc. received from the smartphone 10, and transmits the AR information to the smartphone 10 (Step S2). In the smartphone 10, the AR information is displayed on the screen of the smartphone 10 by the AR information presentation means 12.

If information to the effect that the clip information, etc. are to be deleted is transmitted from the smartphone 10 to the server device 20, the server device 20 deletes the user's clip information, etc.

Regarding the user of the smartphone 10 from which the clip information has been transmitted, the server device 20 forms interest information for the user (Step S3). The interest information formation means 21 forms interest information at an optional timing in regard to item information and shop information as well.

In the server device 20, the distance calculation means 22 calculates the first distance and the second distance between the user's interest information and the pieces of interest information on the item information and the shop information (Step S4), and the distance correction means 25 corrects the first distance and the second distance (Step S5). Then, the recommendation information determination means 23 determines recommendation information based on the first distance and the second distance (Step S6).

Such processings up to the determination of the recommendation information are executed whenever the clip information, etc. are added or deleted in accordance with the operation of the smartphone 10 toward the server device 20.

As shown above, when the user operates the smartphone 10, whereby the object attracting the user's interest is formed as the clip information, etc. (Step S1), the AR information on the object per se is provided to the user (Step S2). On the other hand, it is determined, from the clip information, etc., what the recommendation information highly likely to attract the user's interest or the like is (Step S6), but relevant information is not immediately transmitted to the user's smartphone 10.

During the action by the user carrying the smartphone 10, positional information on the smartphone 10 is transmitted periodically to the server device 20 by the recommendation information presentation means 13 (Step S7). The server device 20 has the recommendation information provision means 24 transmit shop information or item information on a shop or item present within a prescribed range from the smartphone 20, as recommendation information, to the smartphone 10 (Step S8).

The recommendation system 1, the server device 20, and the server program executed by the server device 20 (hereinafter referred to as the recommendation system 1, etc.) according to the embodiment described above form interest information concerning the user, item information and shop information, determine recommendation information if the first distance and the second distance obtained therefrom fulfill the prescribed conditions, and provide the user with the recommendation information.

The interest information for the user is the digitized form of the user's interest or the like. Thus, the item information and shop information having the first distance and the second distance meeting the prescribed conditions have a high possibility of attracting the user's interest. Compared with conventional technologies which give a recommendation to the user based on image data only, therefore, the recommendation system 1, etc. can provide the item information and shop information reflecting the user's interest or the like more appropriately, as recommendation information, to the user.

The recommendation system 1, etc. correct the first distance and the second distance so as to become smaller as the degree of the user's interest or the like heightens. By so doing, the recommendation system 1, etc. can provide recommendation information following a change in the user's interest or the like.

The recommendation system 1, etc. also provide the client device with the recommendation information when the item or shop of the positional information of the item information or shop information as the recommendation information is in a predetermined range from the current position of the smartphone 10. By so doing, the recommendation system 1, etc. remind the user of the product or the like, in which the user had an interest or the like in the past, when the user acts while carrying the smartphone 10, and can strongly motivate the user to visit the shop in order to touch the product or the like actually during the action. From the viewpoint that the user grasped the recommendation information as an advertisement of the product or the like, moreover, the recommendation system 1, etc. exhibit the excellent advertising effect of easily leading to the user's purchasing action, in comparison with an advertisement provided by a conventional browser or the like.

The recommendation system 1, etc. form interest information based on the clip information, action history, and purchase history transmitted from the smartphone 10. By so doing, the recommendation system 1, etc. can provide recommendation information having an even higher possibility of attracting the user's interest or the like.

The recommendation system 1, etc. also provide the smartphone 10 with AR information conformed to image data imaged as the clip information. The AR information is retrieved using, as targets, item information and shop information which are the results of narrowing-down based on the interest information (namely, the results of determination as recommendation information). Since the numerous pieces of item information and shop information are narrowed down thereby, the amount of calculation in pattern matching the image data imaged as the clip information to the image data included in the narrowed-down information can be cut down markedly.

The client program executed by the smartphone 10 of the present embodiment described above collects the clip information, action history and purchase history, and transmits them to the server device 20. Based on the clip information, etc., recommendation information highly likely to attract the user's interest or the like is received from the server device 20, and displayed on the screen.

By this procedure, item information and shop information reflecting the user's interest or the like more appropriately can be provided, as recommendation information, to the user.

Embodiment 2

In Embodiment 1, when the item or shop is located within a predetermined range from the current position of the smartphone 10, recommendation information is transmitted from the server device 20 to the smartphone 10, and the recommendation information is displayed on the smartphone 10. However, the recommendation information may have been transmitted in advance to the smartphone 10. Using FIG. 10, a recommendation system according to Embodiment 2 will be described below. Descriptions of the same constitutions and processings as those in Embodiment 1 will be omitted.

Figure 10:
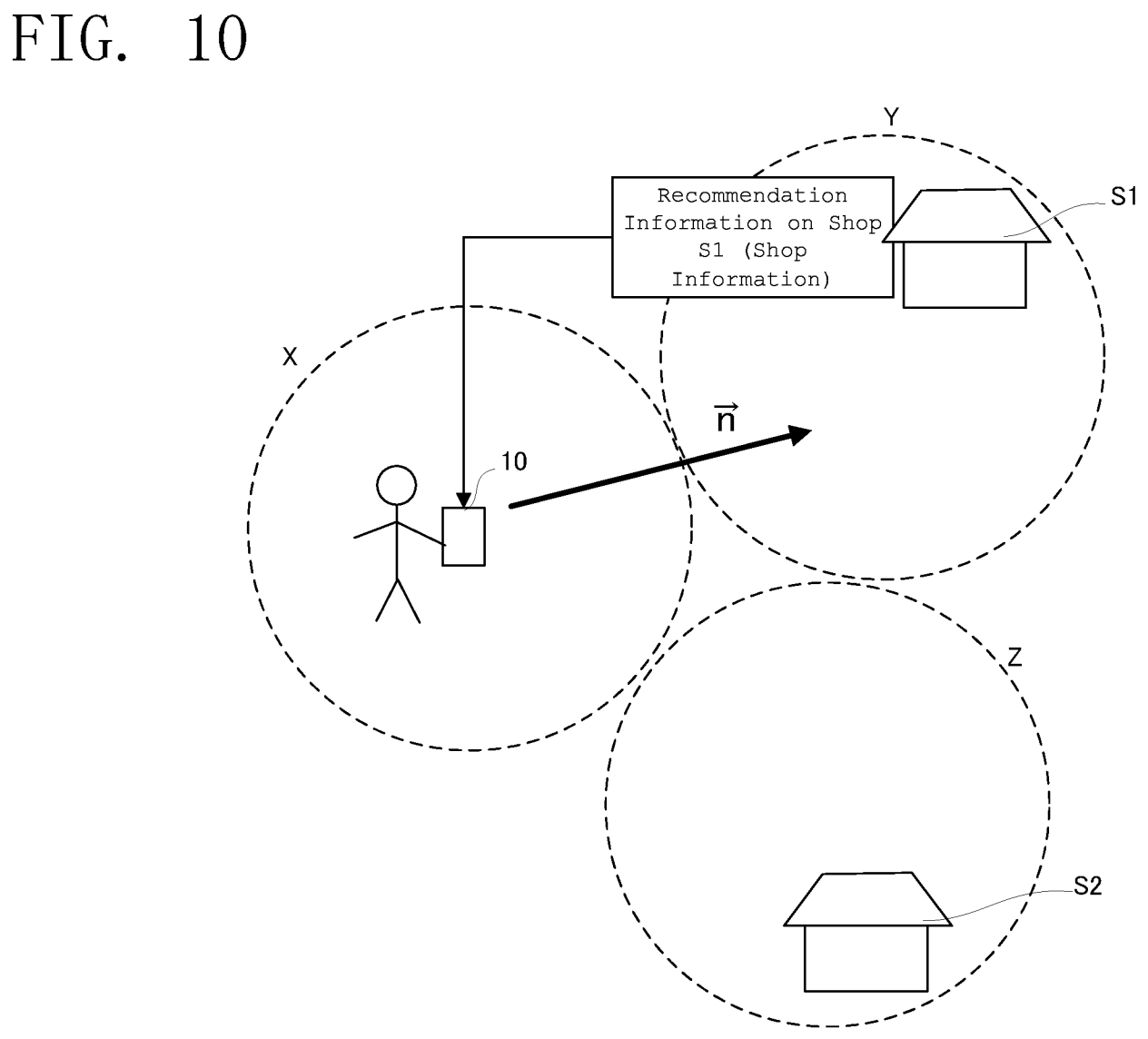

Map information representing positional information on various buildings, roads, etc. is stored in the storage device of the server device 20. FIG. 10 shows this map information and areas. That is, a shop S1 and a shop S2 are shown using the map information. The areas refer to certain ranges on the map. In the example of FIG. 10, three circular areas X, Y and Z are shown. The position of the center of each area serves as the coordinates of each area.

The server device 20 is also equipped with an action prediction means for predicting an area at which the user will arrive in the future. Details of the action prediction means will be described later.

Assume that the action prediction means predicts the arrival of the user at the area Y. In this case, the recommendation information provision means 24 transmits to the smartphone 10, before the user's arrival at the area Y, item information or shop information which includes positional information on an item or shop judged to be present in the area Y, and which has been determined as recommendation information for the user. In the example of FIG. 10, the recommendation information provision means 24 transmits recommendation information on the shop S1 to the smartphone 10.

After the recommendation information is acquired beforehand in this manner, the recommendation information presentation means of the smartphone 10 displays the previously received recommendation information on the screen of the smartphone 10, when the actual entry of the smartphone 10 into the area X is detected.

A method for predicting the user's action by the action prediction means will be described using FIGS. 11(a) to 11(c). The action prediction means finds the user's movement vector a, the user's past vector b, and a movement sample vector c for each road.

The user's movement vector a represents a direction in which the user is currently moving. Concretely, the action prediction means samples positional information, which is transmitted from the smartphone 10, at suitable time intervals. FIG. 11(a) shows a situation in which as a result of the user's action, the action prediction means has obtained 7 pieces of positional information from the smartphone 10. The action prediction means calculates the difference between two consecutive pieces of position information to obtain movement vectors V1 to V6. The action prediction means traces the movement vectors back to a point, at which the lengths of the movement vectors total, for example, 1 km, beginning with the latest movement vector, to select the movement vectors. As a result, assume that the movement vectors V3 to V6 are selected. The action prediction means synthesizes the selected movement vectors to obtain the user's movement vector a.

The user's past vector b represents a direction in which the user has a high possibility of heading now based on the user's past actions. Concretely, the past vector b is found from the difference between an area frequently visited by the user and the current position of the user. As shown in FIG. 11(b), the action prediction means identifies the area which the user frequently visits. For example, for each of a plurality of areas on the map, the action prediction means obtains the number of visits to the area actually visited by the user, and the period of the user's stay in the area. They can be known from the positional information and the map information obtained from the user's smartphone 10. Assume that as a result, a heat area HA most frequently visited by the user is obtained from the user's past actions. The action prediction means finds the past vector b from the difference between the position of the user's current positional information and the position of the positional information on the center of the heat area HA.

The movement sample vector c represents a direction which is obtained from the relationship between the flow of people on a road and a direction where the user heads. Concretely, the flow of people on a main road is held to a vector based on map information. For example, as shown in FIG. 11(c), there is a vector p representing the flow of people going from a certain point P2 to another point P1 on a road R. Such a vector representing the flow of people on the road differs according to a time zone, so that the vector is preferably obtained in each time zone. If a vector ap is assumed along a path from the point P2 up to the position of the smartphone, the action prediction means finds the difference of the vector ap from the vector p to determine the movement sample vector c.

Then, the action prediction means obtains a prediction vector n, which shows the destination of the user's action, by weighting each of the movement vector a, the past vector b, and the movement sample vector c, synthesizing the respective weighted vectors, and multiplying the resulting synthesis product by the movement vector a as indicated by the following equations:

$$n = |a| \times \text{next}$$

$$\text{next} = \text{Weight1} \times a + \text{Weight2} \times b + \text{Weight3} \times c$$

Weight1 to Weight3 refer to weights, which may be set arbitrarily, or may be obtained by the method of least squares. |a| refers to the magnitude of the movement vector a.

That is, the vector n is a synthesis of the movement vector a representing the direction of the user's current movement, the past vector b representing the direction of the user's likely movement based on the user's past actions, and the movement sample vector c taking into consideration the flow of people on the road R. The vector n gives consideration to the past actions and the flow of people on a surrounding road, rather than taking into consideration the user's movement vector a alone. Thus, the vector n enables the direction of the user heading to be predicted with better accuracy.

Once the action prediction means calculates the vector n in the above manner, it identifies an area located beyond the vector n, based on the area X where the user is located in the map information. In the example of FIG. 10, the area lying ahead of the vector n is the area Y. Hence, this area Y is presumed to be an area where the user is highly likely to reach.

Assume, here, that the recommendation information is transmitted in advance without prediction of the user's action. Then, all the areas adjacent to the area X where the user is present have a possibility of the user arriving at them, and are thus considered to be objects of prior transmission thereto of the recommendation information. In the example of FIG. 10, the area Z continuous with the area X also serves as an object of prior transmission of the recommendation information. In this case, recommendation information on the shop S2 included in the area Z, where the user actually fails to reach, is also to be transmitted to the smartphone 10. Consequently, a waste of communication volume can arise.

According to the recommendation system of the present embodiment, however, the area Y is presumed to have a high possibility of the user's arrival, and the recommendation information on the shop S1 in the area Y is transmitted to the smartphone 10 before the user arrives at the area Y. Thus, the recommendation information transmitted to the user's smartphone 10 can be reduced to a minimum required level, and the communication volume can be cut down.

EXPLANATIONS OF LETTERS OR NUMERALS

1 . . . Recommendation system, 10 . . . Smartphone, 11 . . . Interest collection means, 12 . . . Information presentation means, 13 . . . Recommendation information presentation means, 20 . . . Server device, 21 . . . Interest information formation means, 22 . . . Distance calculation means, 23 . . . Recommendation information determination means, 24 . . . Recommendation information provision means, 25 . . . Distance correction means, 26 . . . Information search means

The invention claimed is:

1. A recommendation system, comprising:
a client device owned by a user, and
a server device for providing the client device with recommendation information to be recommended to the user out of item information and shop information,
wherein the server device comprises:
interest information formation means for forming interest information which is a vector obtained by digitizing a plurality of adjectives expressing the user, the item information, and the shop information;
distance calculation means for calculating a first distance between the interest information for the user and the interest information on the item information, and a second distance between the interest information for the user and the interest information on the shop information;

recommendation information determination means for determining that if the first distance meets a prescribed condition, the item information corresponding to the first distance is the recommendation information to be recommended to the user, while if the second distance meets a prescribed condition, the shop information corresponding to the second distance is the recommendation information to be recommended to the user; and
recommendation information provision means for providing the client device with the recommendation information.

2. The recommendation system according to claim 1, wherein
the server device is equipped with distance correction means for correcting the first distance so as to become smaller as the user has a higher degree of interest in the item information, and correcting the second distance so as to become smaller as the user has a higher degree of interest in the shop information.

3. The recommendation system according to claim 2, wherein
the server device is equipped with action prediction means for predicting an area at which the user will arrive in the future, and
the recommendation information provision means provides the client device with the item information and the shop information on an item and a shop present in the area, as the recommendation information, before the user arrives at the area.

4. The recommendation system according to claim 1, wherein
the recommendation information provision means provides the client device with the recommendation information when an item or a shop of positional information on the item information or the shop information being the recommendation information is within a predetermined range from the current position of the client device.

5. The recommendation system according to claim 4, wherein
the server device is equipped with action prediction means for predicting an area at which the user will arrive in the future, and
the recommendation information provision means provides the client device with the item information and the shop information on an item and a shop present in the area, as the recommendation information, before the user arrives at the area.

6. The recommendation system according to claim 1, wherein
the client device is equipped with interest collection means for collecting clip information selected by the user out of the information obtained by the client device; an action history being information representing an action of the user detectable by the client device; and a purchase history being information on a product and a service purchased by the user via the client device, and transmitting the clip information, the action history, and the purchase history to the server device, and
the interest information formation means forms the interest information for the user based on the clip information, the action history, and the purchase history.

7. The recommendation system according to claim 6, wherein the interest collection means transmits image data imaged by the client device, as the clip information, to the server device, the server device is equipped with AR information search means for extracting the item information and the shop information determined as the recommendation information by the recommendation information determination means, performing pattern matching between feature quantities of image data included in the item information and the shop information and a feature quantity of a body imaged in the image data received from the interest collection means to find the former feature quantity pattern-matched to the latter feature quantity, and transmitting the information having the pattern-matched feature quantity, as AR information, to the client device, and the client device is equipped with AR information presentation means for displaying the AR information received from the server device, as information relevant to the image data imaged as the clip information.

8. The recommendation system according to claim 7, wherein the server device is equipped with action prediction means for predicting an area at which the user will arrive in the future, and the recommendation information provision means provides the client device with the item information and the shop information on an item and a shop present in the area, as the recommendation information, before the user arrives at the area.

9. The recommendation system according to claim 6, wherein the server device is equipped with action prediction means for predicting an area at which the user will arrive in the future, and the recommendation information provision means provides the client device with the item information and the shop information on an item and a shop present in the area, as the recommendation information, before the user arrives at the area.

10. The recommendation system according to claim 1 wherein the server device is equipped with action prediction means for predicting an area at which the user will arrive in the future, and the recommendation information provision means provides the client device with the item information and the shop information on an item and a shop present in the area, as the recommendation information, before the user arrives at the area.

11. A server program for having a server device, which transmits recommendation information to be recommended to a user, out of item information and shop information, to a client device owned by the user, function as interest information formation means for forming interest information which is a vector obtained by digitizing a plurality of adjectives expressing the user, the item information, and the shop information;

distance calculation means for calculating a first distance between the interest information for the user and the interest information on the item information, and a second distance between the interest information for the user and the interest information on the shop information;

recommendation information determination means for determining that if the first distance meets a prescribed condition, the item information corresponding to the first distance is the recommendation information to be recommended to the user, while if the second distance meets a prescribed condition, the shop information corresponding to the second distance is the recommendation information to be recommended to the user; and recommendation information provision means for providing the client device with the recommendation information.

* * * * *